United States Patent [19]

Andrews

[11] Patent Number: 4,504,031
[45] Date of Patent: Mar. 12, 1985

[54] AERODYNAMIC BRAKING AND RECOVERY METHOD FOR A SPACE VEHICLE

[75] Inventor: Dana G. Andrews, Seattle, Wash.

[73] Assignee: The Boeing Company, Seattle, Wash.

[21] Appl. No.: 353,828

[22] Filed: Mar. 2, 1982

Related U.S. Application Data

[63] Continuation-in-part of Ser. No. 90,296, Nov. 1, 1979.

[51] Int. Cl.³ .............................................. B64G 1/58
[52] U.S. Cl. .......................... 244/113; 244/110 D; 244/117 A; 244/162; 244/163; 244/169; 244/172
[58] Field of Search ............ 244/110 D, 113, 117 A, 244/138 R, 158, 160, 162, 163, 169, 172; 102/337–340, 348

[56] References Cited

U.S. PATENT DOCUMENTS

| | | |
|---|---|---|
| 1,426,907 | 8/1922 | Ramsey . |
| 2,468,820 | 5/1949 | Goddard . |
| 2,995,317 | 8/1961 | Schoppe . |
| 3,026,806 | 3/1962 | Runton et al. . |
| 3,053,476 | 9/1962 | Mohar . |
| 3,062,148 | 11/1962 | Le Bel . |
| 3,113,750 | 12/1963 | Beardsley . |
| 3,259,065 | 7/1966 | Ross et al. . |
| 3,286,951 | 11/1966 | Kendall . |
| 3,508,724 | 4/1970 | Scher et al. . |
| 3,624,751 | 11/1971 | Dettling . |
| 3,731,893 | 5/1973 | Stalmach, Jr. . |
| 3,785,591 | 1/1974 | Stalmach, Jr. . |
| 4,014,485 | 3/1977 | Kinnaird et al. . |

*Primary Examiner*—Trygve M. Blix
*Assistant Examiner*—Rodney Corl
*Attorney, Agent, or Firm*—Delbert J. Barnard; Joan H. Pauly

[57] ABSTRACT

A space vehicle 10 is steered from outer space toward the earth's atmosphere main rocket nozzle end first. An inflatable braking member 28 is deployed around the vehicle 10 by introducing gas into it. The main rocket motor 16 is ignited to produce a substantially throttled stream of gases. This stream provides a cooling layer forwardly of the braking member 28 to protect the member 28 from heating by friction with the atmosphere. The reduction of the velocity of the vehicle 10 is controlled by directly varying the drag of the vehicle 10 to compensate for variations in the density of the atmosphere. The drag is varied by varying the thrust of the motor 16 and/or varying the shape of the member 28. A backup method is to deflate the member 28 in the atmosphere. The member 28 may be jettisoned after the vehicle 10 leaves the atmosphere to enter a low earth orbit.

19 Claims, 28 Drawing Figures

Fig. 10
t=0 SEC, h=400,000 ft
q=0.015 psf

RE-ENTRY CONFIGURATION

Fig. 11
t=100 SEC, h=273,000 ft
q=8.5 psf

PERIGEE

Fig. 12
t=250 SEC
q=1.5 psf

RELEASE REAR CLAMP ON BAG

Fig. 13
t=300 SEC
q=0.5 psf

BAG MOLDED TO OTV BY DYNAMIC PRESSURE

Fig. 14
t=320 SEC
q=0.3 psf

FRONT CLAMP RELEASED ON BAG

Fig. 15
t=380 SEC
q=0.05 psf

BAG CLEARS SV(10)

Fig. 16 t=400 SEC
q=0.03 psf

ENGINE SHUTDOWN

Fig. 17 t=0.75 HOUR

CIRCULARIZATION BURN

- NO JET FLOW (NO THRUST)
- LOW JET FLOW (LOW THRUST; TANK HEAD IDLE)
- HIGH JET FLOW (HIGH THRUST)
- INTERMEDIATE JET FLOW (PUMPED IDLE)

Fig. 26

Fig. 27 ANGLE AROUND NOZZLE ϕ

Fig. 18
t=0 SEC h=400,000 ft
OPEN LH₂ VALVE TO CHILL LINES

Fig. 19
t=64 SEC h=292,000 ft
START MOTOR USING TANK HEAD IDLE

Fig. 20
t=100 SEC h=265,000
RAISE THRUST TO PUMPED IDLE

Fig. 21
t=120 SEC h=261,000 ft
PERIGEE

Fig. 22
t=140 SEC h=262,500 ft
LOWER THRUST TO TANK HEAD IDLE

Fig. 23
t=250 SEC h=320,000 ft
MOTOR SHUTDOWN

Fig. 24
t=500 SEC h=520,000 ft
RELEASE RESTRAINING STRAPS

Fig. 25
t=45 MIN h=400 n.mi.
DISCARD BRAKING MEMBER DURING APOGEE BURN

AERODYNAMIC BRAKING AND RECOVERY METHOD FOR A SPACE VEHICLE

TECHNICAL FIELD

This invention relates to a method of returning a space vehicle from space and placing it into a low earth orbit where it can be recovered and/or refurbished for reuse, and more particularly, to the use of an aerodynamic braking system to control the vehicle's reentry.

RELATED APPLICATION

This application is a continuation in part of applicant's copending application Ser. No. 06/090,296, filed Nov. 1, 1979, and entitled Aerodynamic Braking System For A Space Vehicle.

BACKGROUND ART

A principal object of the present invention is to provide a low cost system for rendering a space vehicle reusable. There is a need for such a system for use, for example, with space vehicles planned for traveling round trip between a low earth orbit (LEO) and a geo-synchronous earth orbit (GEO)—a mission which will involve a change in velocity of approximately 28,670 feet per second during the round trip.

The kinetic energy of a spacecraft during reentry is many times greater than the amount of energy which in terms of heat, would be needed to bring about complete vaporization of the spacecraft. Retardation and friction with the air on reentry into the earth's atmosphere would release a considerable amount of heat and burn up the reentering body. Indeed, this is the normal fate of meteorites entering the atmosphere from outer space.

The "ablating reentry shield" is a known successful way of preventing space vehicle destruction during reentry. Made of ablative material, the shield dissipates heat by melting and vaporizing. Friction with the air heats the ablative material to a temperature of several thousand degrees centigrade, so that the material becomes liquid and "boils off". The zone immediately behind a shock wave which is formed ahead of the returning space vehicle is heated to about 6,000 degrees C. and is in the gaseous state. About 80% of the thermal energy from the intermediate layer between the liquid and the gaseous layer is dissipated as radiation to the surrounding air. The low conductivity of the still-solid ablative material prevents any substantial amount of heat from penetrating into the space vehicle itself during the reentry. (Which is only 200–300 seconds in duration).

Ablative insulation is lightweight and is adequate for the heat load encountered during a reentry, but it requires that the vehicle be returned to the earth after each flight for a very expensive refurbishment.

Many proposals of using a fluid layer for protecting an aircraft and/or reentry vehicle surface against overheating may be found in the patent literature. Examples of such systems are disclosed by the following U.S. Pat. No. 1,426,907, granted Aug. 22, 1922, to George Ramsey; No. 2,468,820, granted May 3, 1949, to Robert H. Goddard; No. 2,995,317, granted Aug. 8, 1961, to Fritz Schoppe; No. 3,026,806, granted Mar. 27, 1962, to Leslie A. Runton and Henry C. Morton; No. 3,062,148, granted Nov. 6, 1962, to John P. Le Bel; No. 3,113,750, granted Dec. 10, 1963, to Melville W. Beardsley; No. 3,259,065, granted July 5, 1966, to Don H. Ross and Eugene S. Rubin; No. 3,298,637, granted Jan. 17, 1967, to Shao-Tang Lee; No. 3,508,724, granted Apr. 28, 1970, to Stanley H. Scher and James C. Dunavant; No. 3,624,751, granted Nov. 30, 1971, to Ronald F. Dettling; No. 3,731,893, granted May 8, 1973, to Charles J. Stalmach, Jr.; No. 3,785,591, granted Jan. 15, 1974, to Charles J. Stalmach Jr.; and No. 4,014,485, granted Mar. 29, 1977, to Laird D. Kinnaird and Seth B. Moorhead, Jr.

The round trip between a GEO and an LEO is an extremely difficult mission. However, the recent successful beginning of the space shuttle program has made it clear that in the near future there will be a need to accomplish this mission frequently and at a low cost. The already difficult mission will be further complicated when manned space vehicles make the round trip.

Various braking techniques have been proposed to achieve the desired change in velocity when a space vehicle returns from a GEO to an LEO. These include using the vehicle's propulsive power for braking, and grazing the upper atmosphere so that aerodynamic drag, or friction with the atmosphere, will convert the vehicle's kinetic energy into heat. Such a grazing maneuver must be done in a precise manner to avoid the loss of too much velocity, which would cause the vehicle to enter the lower atmosphere and burn up, and the loss of too little velocity, which would cause the vehicle to coast up into the Van Allen radiation belt. The difficulty of making the maneuver precise is greatly increased by navigational inaccuracies and unpredictable variations in the atmosphere. The vehicle could be required to correct for variations in atmospheric density of up to 50%. One method of providing such correction is aerodynamic maneuvering, which uses vehicle lift to climb or descent to compensate for density variations.

Both propulsive braking and aerodynamic maneuvering require major changes in the basic structure of the space vehicle. Propulsive braking requires a large increase in propulsive capability, which necessarily involves the addition of propellant and tankage to the detriment of payload. Aerodynamic maneuvering requires aerodynamic control surfaces, center of gravity offset, or similar schemes and complex control and thermal protection systems. The additional equipment in each case significantly increases the cost, complexity, and weight of the vehicle. The increased weight decreases the payload weight to vehicle weight ratio and thereby further increases the cost of the mission.

The problems presented by such increases in vehicle weight and complexity are further aggravated by the weight and size limitations of the space shuttle and the practical limitations of the space vehicle's structure and propulsive capabilities. Many solutions have been proposed, most of which are very complicated and expensive in that they employ multiple shuttle launches and "on orbit" assembly of a "wagon train" of fuel tanks, propulsion systems, and payload. These complicated procedures probably would work, but to be cost effective, each manned mission would have to accomplish a number of separate tasks and, therefore, would have to spend long periods of time both in GEO, to accomplish the tasks, and in LEO, to organize the mission. The necessity for such time-consuming activity would severely reduce the flexibility of these procedures and might even render them totally impracticable.

A possible alternative to the above complicated procedures is a dramatic increase in the initial launch to low earth orbit capability. However, this alternative would be quite expensive and would require extensive research and development.

Another possible alternative is to temporarily increase the vehicle's drag when it approaches an LEO from a GEO so that the desired reduction in velocity can be achieved by grazing the upper atmosphere. The use of balloon-like structures to provide drag and decelerate an object's descent to earth is well known. Examples of such structures are disclosed in U.S. Pat. No. 3,053,476, granted Sept. 11, 1962, to J. L. Mohar, U.S. Pat. No. 3,286,951, granted Nov. 22, 1966, to R. T. Kendall; and U.S. Pat. No. 3,508,724, granted Apr. 28, 1970, to S. H. Scher et al. Many of these and other known structures and procedures work well in slowing a descent to the earth's surface, but they lack the heat protection and control capabilities necessary for an aerobraking maneuver in the upper atmosphere. Moreover, the addition of known methods of cooling would increase the weight and complexity of such structures to a degree that would make them as impractical as propulsive braking and aerodynamic maneuvering.

The above patents and the prior art that is discussed and/or cited therein should be studied for the purpose of putting the present invention into proper perspective relative to the prior art.

DISCLOSURE OF THE INVENTION

According to the present invention, aerodynamic drag is used for providing most of the change in velocity which is experienced by a space vehicle during a reentry. The space vehicle is provided with an aerodynamic braking member which is moved prior to its use from a stowed position aboard the space vehicle outwardly into an operational position in which it presents a large area braking surface extending generally laterally outwardly from the space vehicle.

The space vehicle is oriented to reenter nozzle end first and the aerodynamic braking member is positioned immediately rearwardly of the nozzle. The main rocket motor is operated to generate coolant gases which are discharged out through the nozzle at rates sufficient to push the bow shock away from the nozzle and to provide a gaseous cooling layer forwardly of the aerodynamic braking surface, but without reducing the drag of the braking surface by any substantial amount.

According to an aspect of the invention, liquid oxygen and liquid hydrogen are used as fuels, both for producing thrust gases during travel of the space vehicle and for producing cooling gases during reentry.

According to another aspect of the invention, the aerodynamic braking member is an inflatable member and some of the hydrogen fuel is introduced into it, in a gaseous state, for inflating such member into its use configuration.

According to a basic aspect of the invention, a space vehicle that is to be recovered from outer space for reuse is guided back toward the earth. As the vehicle approaches the earth's atmosphere, it is oriented so that the nozzle of the main rocker motor leads. Then, the aerodynamic braking member is moved from its stowed position out into its operational position, and the main rocket motor is operated to provide a cooling layer of gases for the large area anterior braking surface of the aerodynamic braking member. In this manner the necessary change in velocity of the space vehicle is achieved.

According to a further aspect of the invention, the aerodynamic braking member is jettisoned following vehicle slowdown to the proper velocity. Then the space vehicle is reoriented and operated to place it into a low earth orbit (LEO), for eventual recovery and refurbishment.

If the aerodynamic braking member has been jettisoned, the space vehicle must be equipped with a new aerodynamic braking member prior to its next flight. However, the cost of such a refurbishment is substantially less than the cost of replacing ablative insulation.

Accordingly, a principal object of the invention is to provide an economical way of recovering a space vehicle for reuse.

One of the most important features of the invention is the varying of the drag of the space vehicle to correct for navigational errors and variations in the density of the atmosphere. This is done without reducing the drag of the braking surface by any amount substantial enough to render the braking surface ineffective in reducing the velocity of the space vehicle down to the desired level. In other words, the drag of the braking surface is always maintained within the range necessary for such surface to perform its braking function. The varying of the drag provides the control necessary to insure that the velocity is reduced in a precise manner.

According to an aspect of this important feature, the main rocket motor of the space vehicle is operated to produce gases, and the flow rate of such gases out through the main rocket nozzle is regulated so that the gases will flow back and outwardly to provide a cooling layer forwardly of the braking surface. While the rocket motor is being so operated, steps are taken for varying the drag of the space vehicle to correct for navigational errors and variations in the density of atmosphere so that the braking member will reduce the velocity of the space vehicle down to a desired level.

According to another aspect of this important feature, the steps for varying the drag of the space vehicle comprise varying the thrust of the rocket motor, while the flow rate of such gases is being so regulated, to vary the flow field of such gases around the braking member. This varies the drag of the braking surface and thereby varies the drag of the space vehicle. Thus, the velocity of the space vehicle is reduced to the desired level and, at the same time, such gases provide a cooling layer forwardly of the braking surface.

According to still another aspect of this important feature, the steps for varying the drag of the space vehicle comprise keeping the thrust of the rocket motor constant and, at the same time, maintaining a preprogrammed internal pressure in the inflatable aerodynamic braking member to allow said member to change shape with variations in the density of the atmosphere. The result is that the braking member automatically corrects for such variations in density of varying the effective drag area of the member and, thus, varying the drag of the space vehicle.

According to a preferred aspect of the invention, the rocket motor is shut off after the velocity of the space vehicle has been reduced to the desired level. Then, the inflatable aerodynamic braking member is allowed to cool and deflate, and the space vehicle is allowed to leave the sensible atmosphere. When the space vehicle has left the sensible atmosphere, connections between the space vehicle and the braking member are released to clear directional rockets aboard the space vehicle. Finally, the directional rockets are operated to orient the space vehicle, and the main rocket motor is operated to propel the space vehicle, to place the space vehicle into a low earth orbit. During the operation of the main rocket motor for so placing the space vehicle, the braking member can be jettisoned, if desired, such as when the vehicle is to be returned to earth by the space shuttle.

The use of the aerodynamic braking member combined with the drag control feature provides a method of decelerating a space vehicle with the required heat protection and control capabilities, but without significant additions to the weight and/or complexity of the space vehicle. The guidance accuracy required is readily available. Thus, the basic space vehicle can remain essentially unchanged, and the deliverable payload is about twice as much as that for braking methods that require additional heavy equipment. In addition, the aerodynamic braking member is highly reliable and relatively inexpensive and can be constructed of and insulated by state-of-the-art materials.

These and other objects, features, and advantages will become apparent from the detailed description of the best modes for carrying out the invention that follows.

BRIEF DESCRIPTION OF THE DRAWINGS

In the drawings, like element designations refer to like parts, and.

BEST MODES FOR CARRYING OUT THE INVENTION

Figures 1, 3:
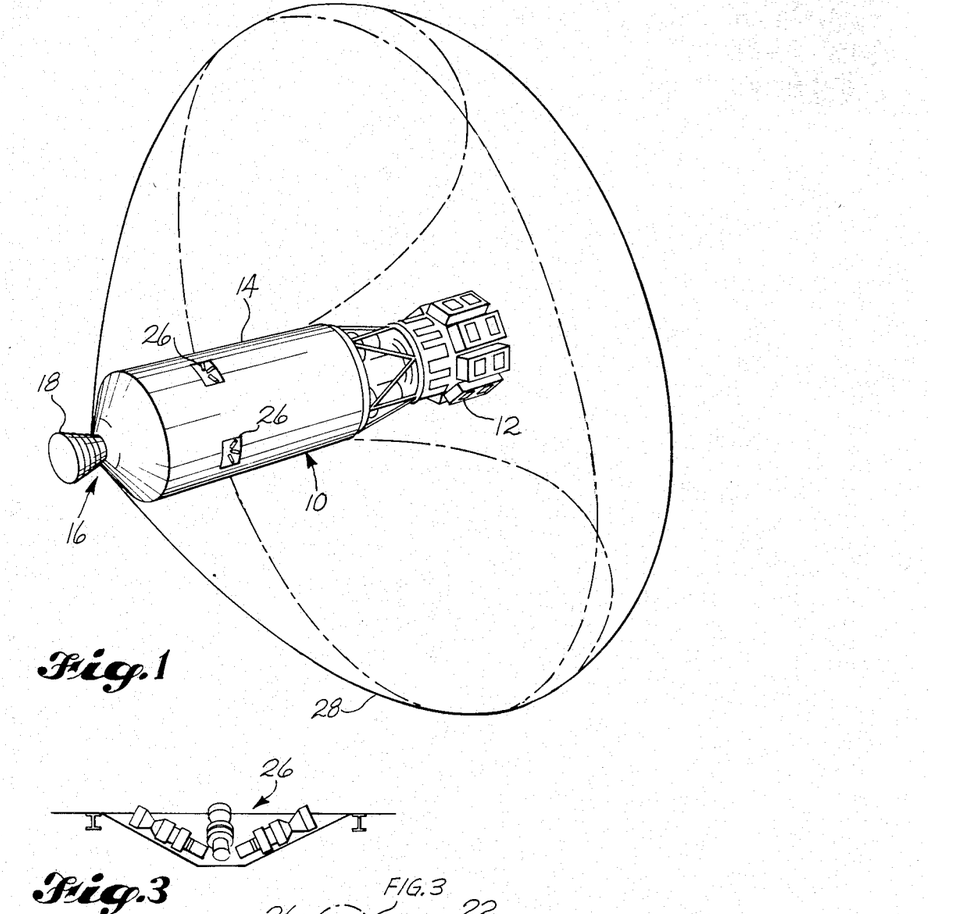
FIG. 1 is an isometric view of a space vehicle which is equipped with an aerodynamic braking system constructed in accordance with the requirements of the present invention, such view showing the aerodynamic braking member in its operational position.
FIG. 3 is an enlarged scale fragmentary view of a side region of the space vehicle, showing a portion of a set of thrusters which are used for steering the space vehicle.
Figure 2:
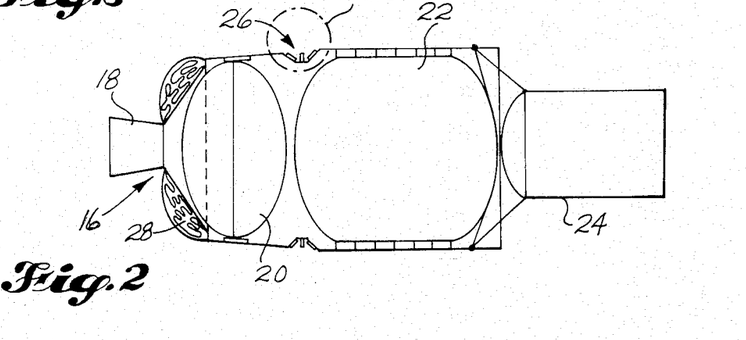
FIG. 2 is an axial sectional view of the space vehicle shown in FIG. 1, with the braking member in its stowed position.

FIGS. 1-3 illustrate a space vehicle 10 of a type which might be used for carrying a payload or cargo 12 out to a location in far out outer space, e.g. out to a geosynchronous earth orbit (GEO).

The space vehicle comprises a body 14, shown in the shape of a cylinder, and a rocket motor 16 at one end of the body 14, including a rocket nozzle 18 oriented to discharge gases axially of the body 14. A pair of tanks 20, 22 for liquid bi-propellants, such as liquid oxygen (20) and liquid hydrogen (22), are contained within the body 14. Suitable apparatus of a conventional nature and forming no part of this invention is provided for metering and delivering the fuel components into the rocket motor 16.

A "payload" carrying frame 24 is provided at the end of body 14 opposite the nozzle 18.

The rocket motor 16 constitutes the main rocket motor for the space vehicle 10. During normal operation the fuel components are combined within the rocket motor 16 to produce propulsion gases which discharge from the nozzle 18 and propel the space vehicle 10 in the well known manner. Space vehicle 10 is also provided with a plurality of small directional rockets or thrusters 26 (FIG. 3) which in a known manner are used for steering the space vehicle 10.

According to an aspect of the invention, an aerodynamic braking member, shown in the form of an inflatable bag 28, is connected to the vehicle and is movable from a stowed position adjacent the vehicle out into an operational position in which it projects generally laterally out from the space vehicle 10 and presents a large area conical anterior surface 32.

The presently preferred form of bag member 28 is toroidal in form. It includes a small diameter front end which is secured to the space vehicle 10 generally at the throat region 30 of the rocket nozzle 18. When deployed the bag 28 presents a large area anterior surface 32 which is conical in form. Surface 32 sweeps rearwardly and after reaching a maximum diameter starts decreasing in diameter and then makes a reverse curve back to the starting point at region 30. A plurality of straps 34 hold the bag 28 in position relative to vehicle 10. Each strap 34 is secured at one end 36 to a rear portion of the bag 28. The opposite end of each strap 34 is secured to the vehicle body 14 at a location 38 adjacent the end of body 14 opposite the rocket nozzle 18. The straps 34 are spaced circumferentially about the vehicle body 14. Straps 34 are long enough so that they will permit the deflated bag 28 to be moved towards nozzle 18 and folded into a compact package in the region immediately surrounding the nozzle throat 30.

The bag 28 is a completely closed structure. A plurality of gas inlets 41, 41' (FIGS. 4 and 5) are provided at the nozzle end of the vehicle body 14, for communicating a source of inflation gas within vehicle body 14 with the interior of bag member 28. One or more circular connectors (e.g. clamps 43) are used for securing the nozzle end of the bag 28 to the vehicle body 14. A similar type of connector 45 is used at location 38 for securing the vehicle ends of the straps 34 to the vehicle body 14. Each connector member 43, 45 includes an explosive device or squib which when activated will explode and cause the connector to break apart. When this happens the bag is released from the vehicle body.

Figure 4:
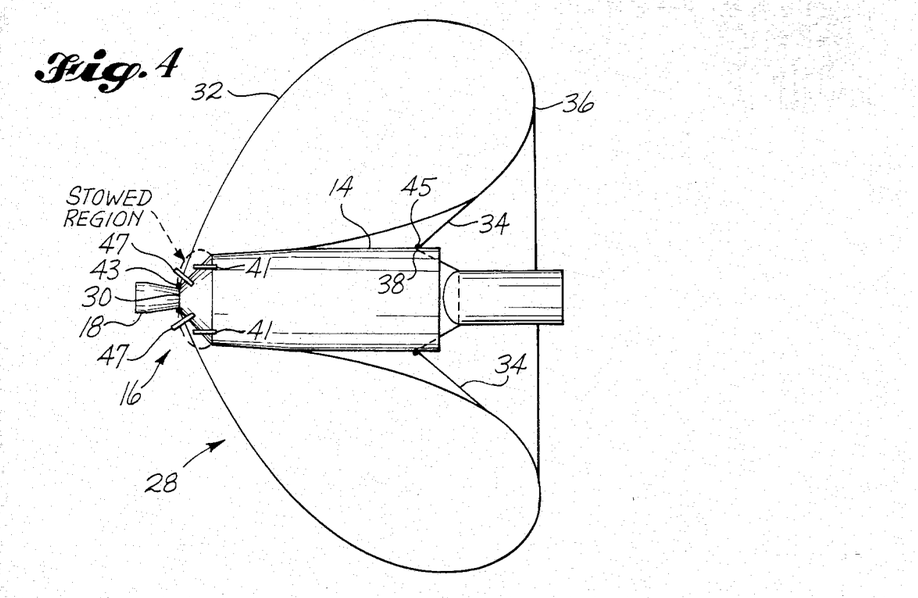
FIG. 4 is an axial sectional view of a space vehicle equipped in accordance with the requirements of a first, preferred embodiment of the invention, in which an inflatable aerodynamic braking member is secured at its forward end to the throat region of the nozzle of the main rocket motor and is stowed at the end of the space vehicle in an annular region immediately axially inboard of the nozzle throat.
Figure 5:
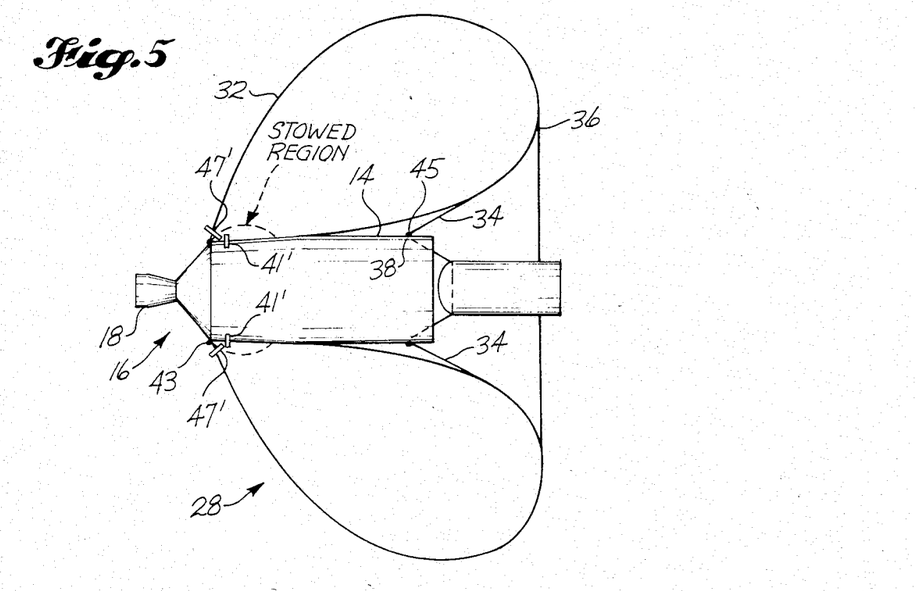
FIG. 5 is a view like FIG. 4, but the space vehicle is equipped for practicing a modified embodiment of the invention, in which the forward end of the inflatable aerodynamic braking member is secured to an edge region of the space vehicle and is stowed within a peripheral region immediately axially inboard of such edge region.

The embodiment shown by FIG. 5 differs from the embodiment shown by FIG. 4 only in the location of the gas inlets 41', the connection 43' at the nozzle end of the vehicle body 14, and the stowed position of the bag.

FIG. 2 shows the bag 28 stowed at the nozzle end of the vehicle, in the annular end wall region substantially immediately surrounding the nozzle throat 30. The stowed bag 28 is enclosed by a cloth cover which may itself be secured in place by means of a circular connector which includes an explosive charge. The explosive charge is operated to sever the connector to in that manner release the cloth cover so that the bag 28 is free to be deployed.

Figure 6:
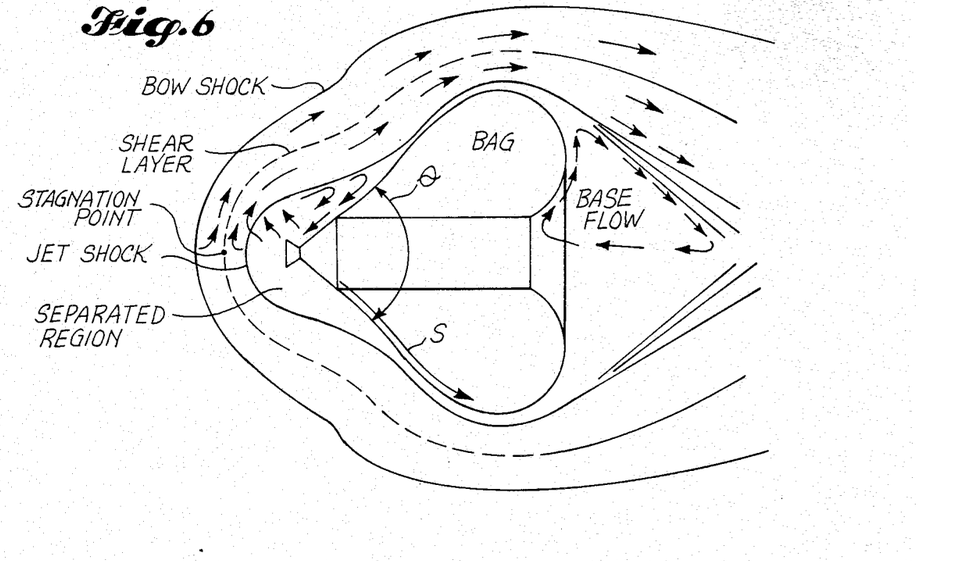
FIG. 6 is a flow field diagram of the form of inflatable aerodynamic braking member which is shown by FIG. 5.

FIGS. 1 and 4-6 show the general shape of the bag during travel of the space vehicle 10, nozzle end first, with bag 28 deployed. FIG. 6 shows the flow field which exists about the bag 28 during flight within the earth's atmosphere.

Figure 7:
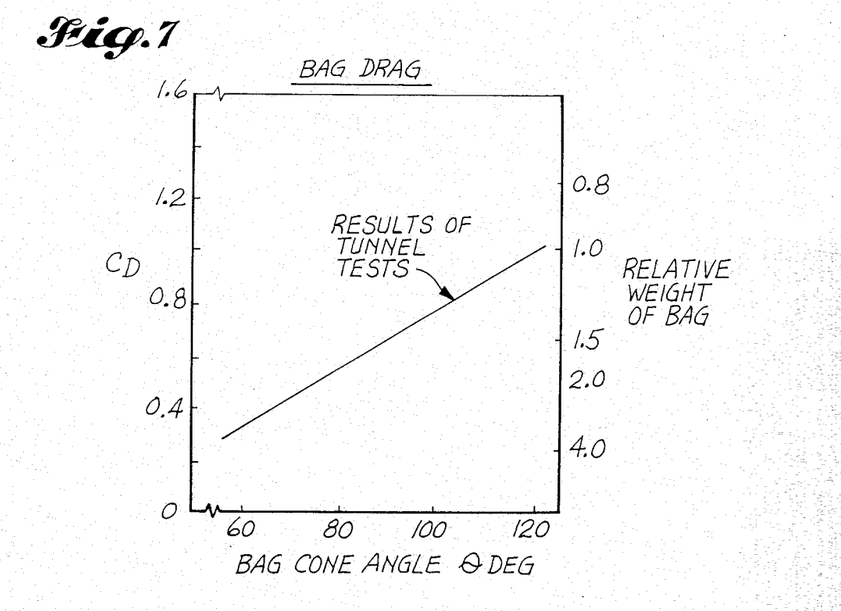
FIG. 7 is a graph of drag and relative weight of the braking member versus the braking member cone angle, in degrees.

FIG. 7 is a plot of bag cone angle $\theta$ (FIG. 6) vs. drag coefficient and the relative weight of the bag 28. This plot is the result of wind tunnel tests.

Figure 8:
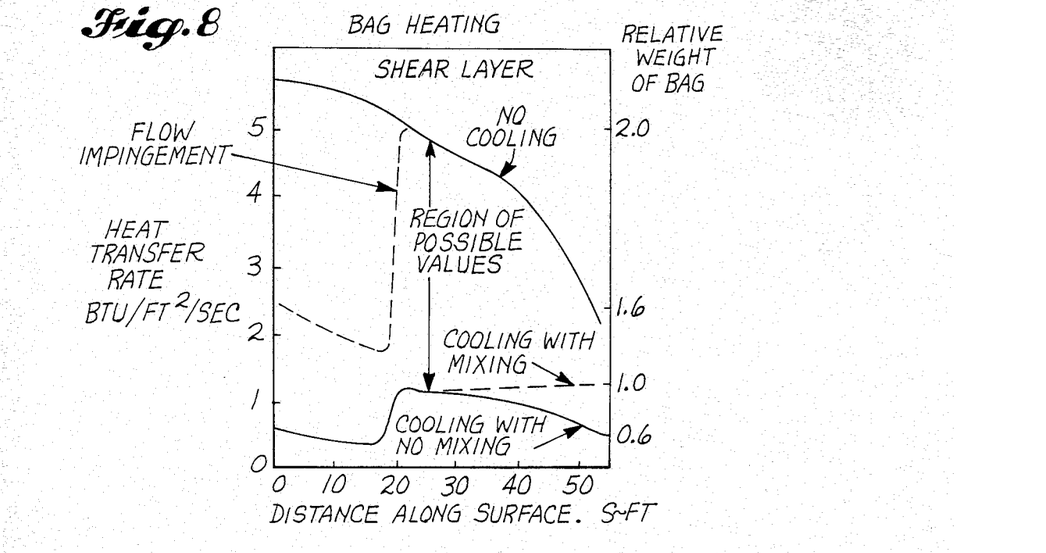
FIG. 8 is a graph of heat transfer rate, in BTU/FT2/-SEC, and relative weight of braking member versus distance along braking surface in feet.

FIG. 8 is a graph of distance S along the bag surface, in feet, vs. heat transfer rate and relative weight of the bag. The graph of FIG. 8 includes the expected performance of a layer of coolant gases provided by the rocket motor 16, in a manner to be hereinafter described.

As previously described, when it is desired to propel the vehicle 10 along some chosen path of travel, the rocket motor 16 is operated to provide propulsive thrust. Of course, during such operation the rocket nozzle 18 is at the rear of the space vehicle 10 and the propulsive stream of gases is being discharged behind the vehicle, along a path coinciding with the longitudinal center line of the space vehicle 10.

Preparatory to making a reentry, the rocket motor 16 is off and the thrusters or directional rockets 26 are operated, in a well known manner, to reorient the space vehicle 10 so that the rocket nozzle 18 leads the space vehicle 10 as it continues moving towards the earth. The squib that is a part of the connector which serves to secure the fabric cover over the folded bag 28 is operated to remove the cover so that the bag 28 can be deployed. The bag 28 is deployed by introducing an inflation gas into it, through a plurality of nozzles wich are provided adjacent where the bag is connected to the vehicle. The inflation gas may comprise a portion of one of the fuel components alone, e.g. hydrogen which is stored as a liquid but introduced into the bag in a gaseous state, or a combination of a gaseous fuel component and some other gas from a source carried by the vehicle, or such other source alone. Normal operation of the space vehicle 10 may produce a quantity of waste steam or water vapor which could be used to inflate, or at least help inflate, the bag 28.

Figure 9:
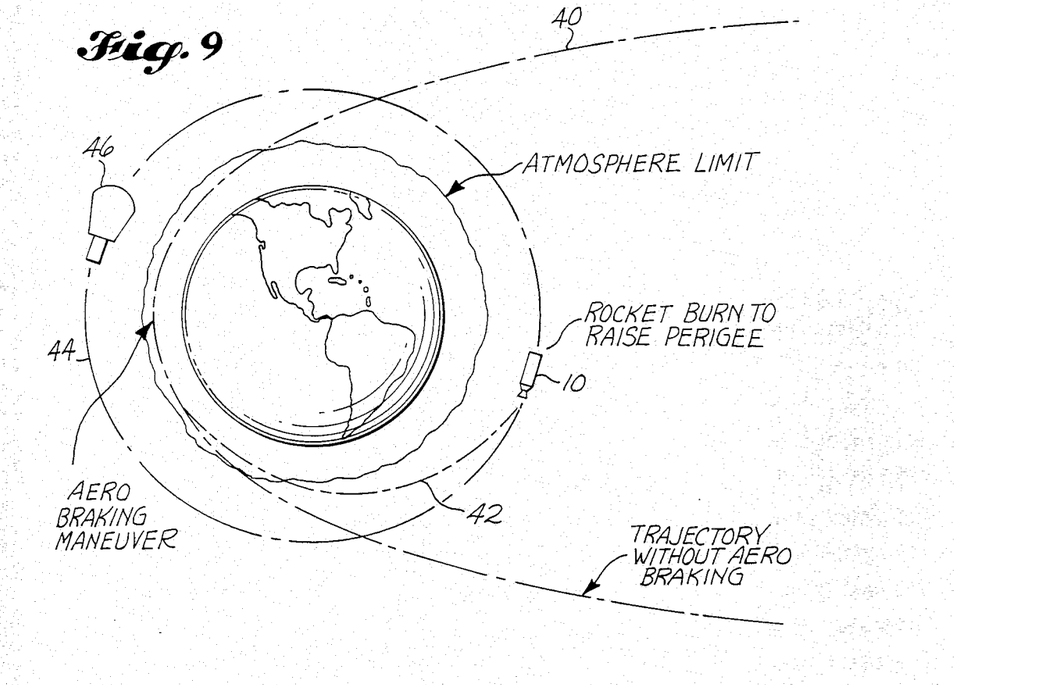
FIG. 9 is a diagram of the travel path of a space vehicle which is in the process of being recovered for reuse by use of the method of the present invention.

FIG. 9 shows one possible use of the aerodynamic braking system and recovery method of the present invention. The space vehicle 10 is brought from outer space back towards the earth along a path 40. Path 40 meets at a tangent with an orbit 42 which is substantially at the atmospheric limit, inside of a low earth orbit (LEO) 44. It is within this orbit 42 that the aerodynamic braking maneuver is performed.

Figure 10:
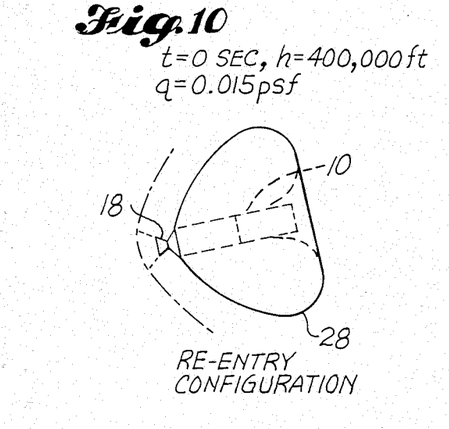
FIGS. 10-17 are operational state views of the space vehicle, depicting the several stages of the aerodynamic braking member while practicing an embodiment of the present invention.

Referring now to FIG. 10, the bag 28 is inflated or deployed into its reentry configuration. The main rocket motor 16 is operated to produce a quite low velocity stream of hot gases for providing a cooling layer of gases over the anterior or leading surface 32 of the bag 28 (FIG. 6).

Figure 11:
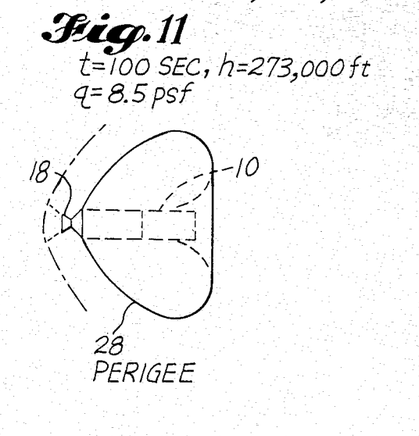
Figure 12:
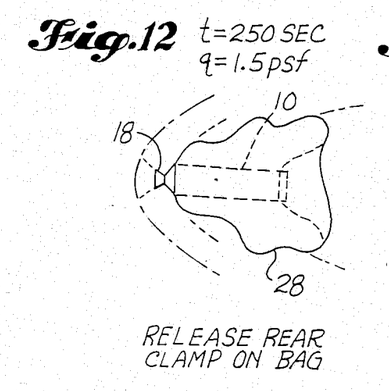

FIG. 11 depicts the bag 28 in operation after the space vehicle 10 has encountered the earth's atmosphere.

Figures 22, 23:
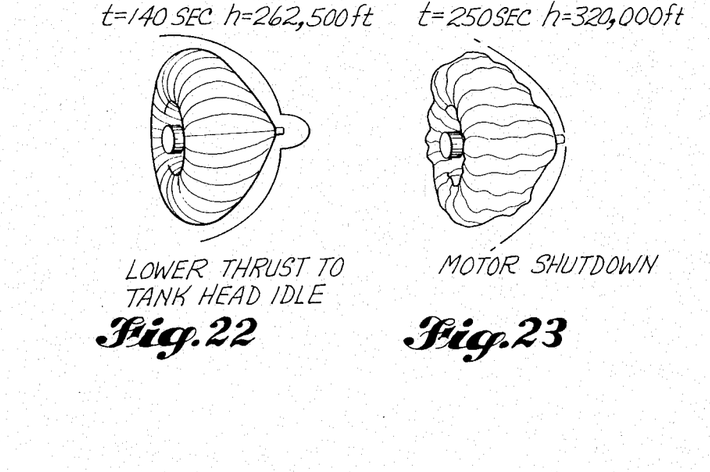
Figures 24, 25:
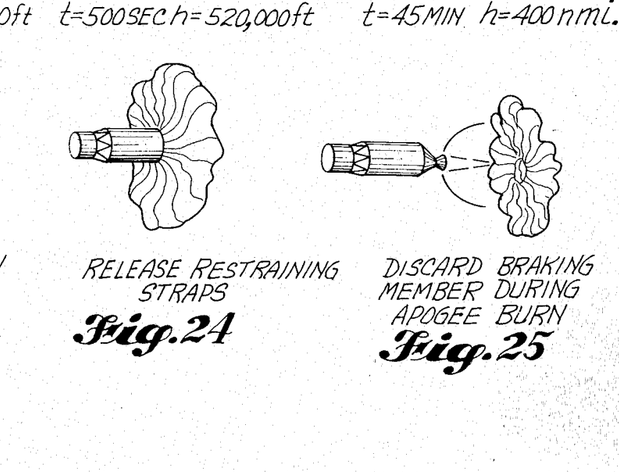

There is more than one procedure that can be followed once the velocity of the space vehicle 10 has been reduced to the desired level. Currently, the preferred procedure, illustrated in FIGS. 23-25, is to shut off the main rocket motor 16 and, then, allow the bag 28 to gradually cool and deflate until the space vehicle 10 has left the sensible atmosphere. When the space vehicle 10 is outside the sensible atmosphere, the straps 34 are released by activating the squibs included in connector members 45 and the motor 16 is operated at low thrust to move the bag 28 toward the motor 16 by decelerating the vehicle 10 relative to the bag 28. This clears the directional rockets 26 so that they can be operated to orient the vehicle 10 for placement into a low earth orbit (44 in FIG. 9). Then, the rocket motor 16 is operated at relatively high thrust to propel the vehicle 10 into orbit 44 where it meets with a recovery vehicle as described below or is temporarily joined to a space station. In the latter case, the vehicle 10 is refurbished while it moves with the space station in orbit 44. If the vehicle 10 is going to be returned to earth in a recovery vehicle, the bag 28 is preferably jettisoned from the space vehicle 10 as the vehicle 10 is being propelled to orbit 44, and the bag 28 reenters the atmosphere on its next pass. The jettisoning is accomplished by activating the squibs included in connectors 43, thus breaking connectors 43 apart, and allowing the thrust of rocket motor 16 to blow the bag 28 away.

Although the above procedure is currently the preferred one to be followed after the desired reduction in velocity has been attained, other procedures are also possible. One such alternative is illustrated in FIGS. 12-17 and is described below. It is not preferred because: it requires the bag 28 to clear the payload when such bag 28 is discarded; a snag during the discarding process would cause the directional rockets 26 to be obstructed; and the heat protection afforded by the bag 28 is removed earlier than in the preferred procedure. Therefore, the following description should be read with these limitations in mind.

Following the desired slow down, the explosive device which is a part of the rear connector is operated, to release the hold on the bag 28 at the rear end of the vehicle 10. At about the same time the bag 28 is vented so that the gases will be forced out from the interior of the bag 28.

Figure 13:
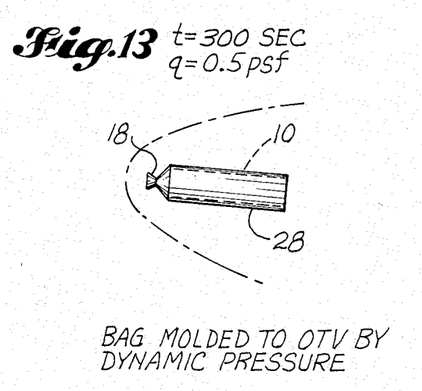
Figure 14:
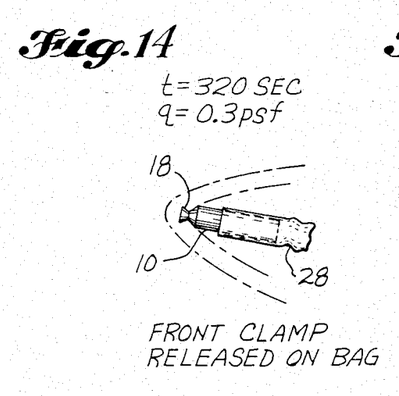
Figure 15:
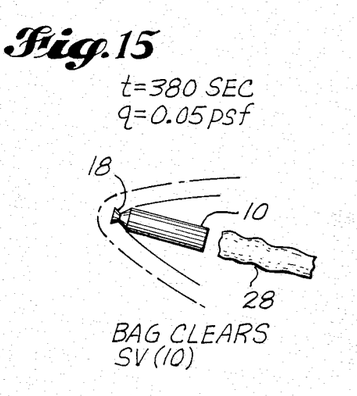
Figure 16:
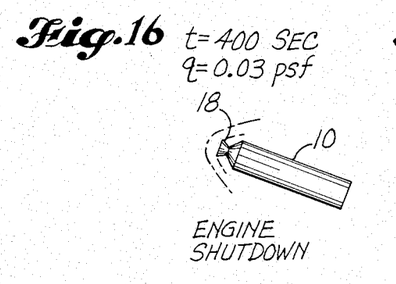
Figure 17:
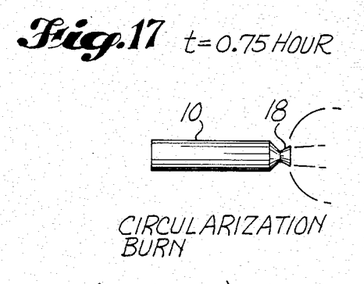
Figures 18, 19:
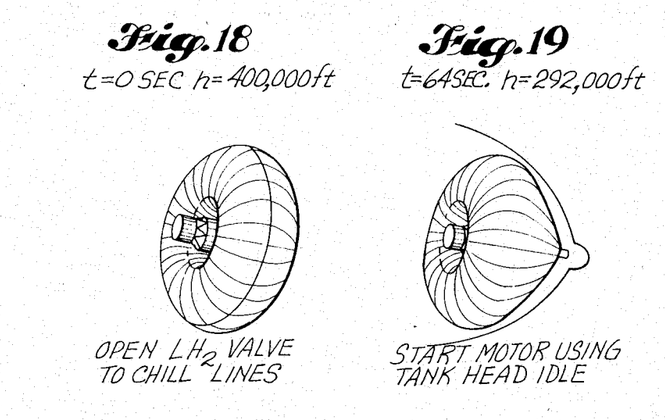
FIGS. 18-25 are operational state views of the space vehicle, depicting the several stages of the aerodynamic braking member while practicing a preferred embodiment of the present invention.

As shown by FIG. 13, the deflated bag 28 is molded to the outer surface of the vehicle 10 by dynamic pressure acting on it during continued travel of the vehicle 10 along the atmospheric orbit 42. A short time following complete deflation of the bag 28, the explosive device that is a part of the front clamp or connector is operated to release the final connection between the bag 28 and the vehicle, so that the dynamic pressure will force the bag 28 completely off from the vehicle 10. This is depicted by FIG. 15.

Following jettisoning of the bag 28, the main rocket motor 16 is shut down (FIG. 16) and the thrusters 26 are operated to align the vehicle 10 along the desired trajectory. Then, the main rocket motor 16 is reignited and used for propelling (FIG. 17) the space vehicle 10 to bring it up into the low earth orbit 44 where it will remain until it meets with a recovery spacecraft, e.g. a space shuttle 46. The space vehicle 10 may be temporarily joined to the space shuttle and be refurbished while both vehicles 46, 10 are together moving in the orbit 44, or the space vehicle 10 may be picked up by the space shuttle 46 and taken back to the earth for refurbishment.

If the space vehicle 10 is returned to earth, refurbishment of the space vehicle 10 for another trip back into outer space involves equipping it with a new bag 28, a new bag cover, new explosively released connectors, etc. If the space vehicle 10 is refurbished in orbit, the bag 28 can be repacked and reused. Even if it is necessary to return the space vehicle 10 to earth for such refurbishment, the cost of refurbishment is substantially less than would be encountered if an ablating reentry shield were used.

The inflatable bag or "decelerator" may be of the type disclosed in a May 22, 1968, report by Goodyear Aerospace Corporation of Akron, Ohio, to the National Aeronautics and Space Administration, authored by R. Reed Barton and entitled "Development of Attached Inflatable Decelerators for Supersonic Application" (NASA CR-66613). The contents of this report are incorporated herein by this specific reference.

A braking maneuver in the upper atmosphere, such as the one shown in FIG. 9, must be performed precisely in order to avoid losing too much velocity, and thereby causing the vehicle to enter the lower atmosphere and burn up, and to avoid losing too little velocity, and thereby causing the vehicle to coast up into the Van Allen radiation belt. Performing a precise braking maneuver is complicated by navigational inaccuracies and variations in atmospheric density which could make necessary correction for density variations of up to 50%. Hence, one of the most important features of this invention is the varying of the drag of the space vehicle 10 directly to correct for variations in density.

Once the space vehicle 10 has been oriented to move towards the earth main rocket nozzle end first and the bag 28 has been deployed, the main rocket motor 16 of the space vehicle 10 is operated to produce a substantially throttled stream of gases. The flow rate of these gases out through the rocket nozzle 18 is regulated so that the gases will flow back and outwardly to provide a cooling layer forwardly of the anterior braking surface 32. While the main rocket motor 16 is being so operated and the flow rate of the gases is being so regulated, steps are taken to vary the drag of space vehicle 10. This corrects for navigational errors and variations in the density of the atmosphere so that the bag 28 will reduce the velocity of the space vehicle 10 down to a desired level.

Currently, the primary procedure contemplated by the applicant for varying the drag of the space vehicle 10 involves varying the thrust of the main rocket motor 16. Changing the thrust of the main rocket motor 16 varies the flow field of the glass around the bag 28. This varies the drag of the braking surface 32 of the bag 28 and, thereby, varies the drag of the space vehicle 10. Although the thrust is varied, the flow rate of the gases is maintained within the range in which the gases flow back and outwardly to provide cooling layer forwardly of the braking surface 32. The result is that the velocity of the space vehicle 10 is reduced to the desired level and, at the same time, the braking surface 32 is protected against destructive heating by friction.

Figure 26:
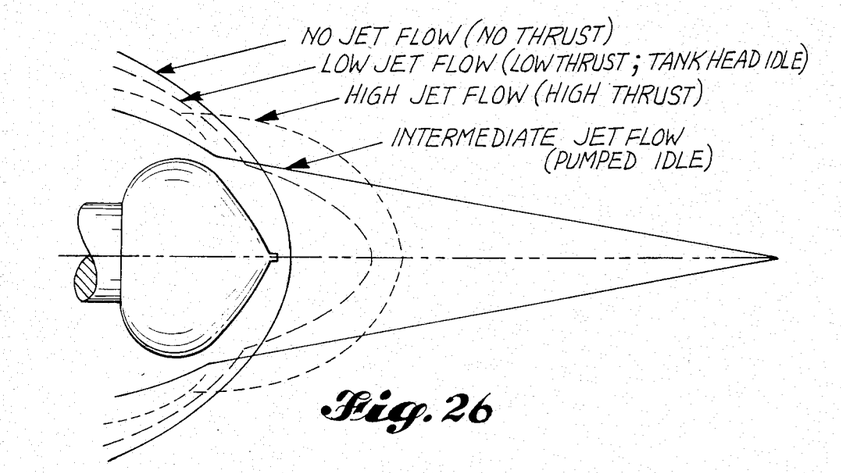
FIG. 26 illustrates the changes in bow shock structure caused by changes in the thrust of the rocket motor.

Varying the thrust of the rocket motor 16 changes the bow shock structure shown in FIG. 6. FIG. 26, which is a summary of flow visualization photographs taken during wind tunnel testing, illustrates how the bow shock structure changes with changes in the thrust of the rocket motor 16. The low jet flow condition of the bow shock structure is that which is shown by FIG. 6. As the thrust of the rocket motor 16 increases from low jet flow to an intermediate jet flow, the jet pressure of the rocket motor 16 adjusts to the pressure behind the bow shock through a series of oblique shocks. Since the total pressure loss through oblique shocks is much less than the pressure loss through strong shocks, the jet pressure of the rocket motor 16 penetrates far upstream into the free-stream flow and produces an "aerospike" effect. At both low jet flow and high jet flow, the separation of the bow shock from the nozzle 18 of the main rocket motor 16 is considerably less than that in the aerospike effect because, in the case of low jet flow, oblique shocks occur inside the nozzle 18 and the flow exiting the nozzle is already subsonic (and therefore no strong external shock is necessary for the jet pressure to adjust to the pressure behind the bow shock) and, in the case of high jet flow, a single external strong shock, rather than a series of weak shocks, occurs.

Figure 27:
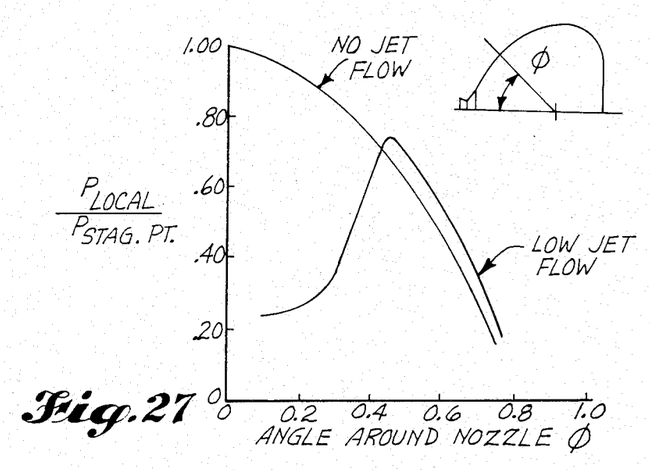
FIG. 27 is a graph of the ratio of local pressure at points along the braking member to stagnation pressure versus angle around the nozzle, in radians.

The drag present in the no jet condition is reduced for all of the jet flows shown in FIG. 26 because the stagnation point (the point at which the flow is at rest with respect to the vehicle 10 and divides to accelerate along the sides of the vehicle 10) is moved away from the nozzle 18 and the free-stream flow sees a more streamlined shape with a resulting reduction in drag (i.e., the vehicle 10 and jet flow act like a more streamlined body in the free-stream flow). FIG. 27 shows the results of wind tunnel tests in which pressures at points along the bag 28 near the nozzle 18 were measured in no jet flow and low jet flow conditions. Even though the drag is reduced in a local region about the rocket motor 16, the total integrated drag at the low jet flow condition remains close to the no jet condition. In contrast, in the intermediate jet flow condition, the drag is reduced to about only 10% of the no jet flow condition. This large change in the drag resulting from a modest change in the jet flow accounts for the high degree of effectiveness of varying the thrust of the rocket motor 16, and thereby varying the jet flow, in order to vary the drag of the space vehicle 10.

Figure 20:
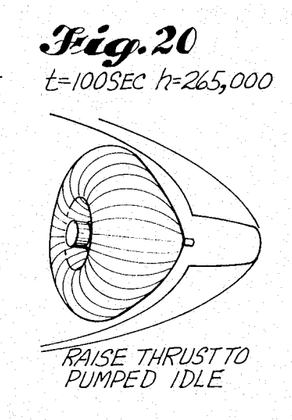
Figure 21:
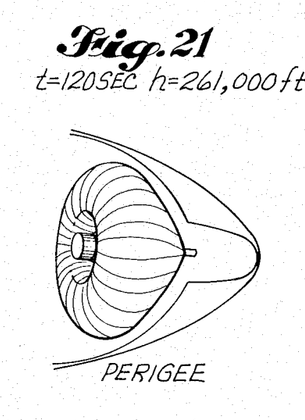

The actual operation of the technique of drag control by varying the thrust of the rocket motor is illustrated in FIGS. 18–25. Once the inflatable bag 28 has been deployed, the liquid hydrogen valves are opened to chill the lines, as in FIG. 18. After 64 seconds, the main rocket motor 16 is started and is run in the tank head idle mode, equivalent to the low jet flow condition. The motor 16 is maintained at tank head idle until 100 seconds have elapsed, and during this period vehicle deceleration versus time is measured using accelerometers. The measured deceleration is compared with decelerations associated with the design trajectory (defined below), and the differences are used to calculate when and for how long the thrust of the rocket motor 16 should be increased to pumped idle, equivalent to the intermediate jet flow condition, to correct for density variations. When the density is at a minimum level and, therefore, more deceleration is required, the rocket motor 16 will be maintained at tank head idle. When the density is at a maximum level and, therefore, less deceleration is required, the rocket motor 16 will be operated at pumped idle for 40 seconds during which the space vehicle 10 will go through perigee. This latter situation is illustrated in FIGS. 20-22. For intermediate level densities, the rocket motor 16 will be operated at pumped idle for a period of time less than 40 seconds.

The design trajectory is the trajectory with the minimum expected densities for which the vehicle can lose sufficient velocity to complete its mission. Since the operation described above only provides for decreasing drag and not for increasing drag, steering the space vehicle 10 into the design trajectory does not work of the densities encountered are less than the design densities. Therefore, a nominal trajectory is selected which has an expected density at perigee that is 20% greater than the expected density at the design perigee altitude. The space vehicle 10 is steered toward this nominal trajectory. Thus, the braking maneuver can be performed in a precise manner and the space vehicle 10 is able to reach its destination orbit in a single pass even if the density it encounters is 20% less than that expected in the nominal trajectory. When the density encountered is more than the minimum level (the density expected in the design trajectory), the drag of the space vehicle 10 is reduced as described above. Plus or minus 20% density variation is the maximum variation expected with existing guidance and navigation systems.

In a preferred embodiment, liquid oxygen and liquid hydrogen are combined to provide the fuel for the rocket motor 16. They are metered and delivered in the well-known fashion to produce a high velocity gas stream to provide thrust during periods in which the rocket motor 16 is being used for propelling the space vehicle 10. They are similarly metered and delivered to produce a substantially throttled stream of gases when the space vehicle 10 is being recovered and the bag 28 is operational. This throttled stream of gases provides a layer of gases over the anterior surface 32 of the bag 28 to shield the bag 28 against destructive heating by friction with the atmosphere. It also provides the means for varying the drag of the space vehicle 10 by varying the thrust of the motor 16 so that the bag 28 will reduce the velocity of the space vehicle 10 to the desired level.

Preferably, the aerodynamic braking member takes the form of the inflatable bag 28 described herein. Also preferably, the inflation gas used to move such inflatable bag 28 from its stowed position to its operational position is obtained by introducing some of the fuel composition for the rocket motor 16, which is stored aboard the space vehicle 10 in a liquid state, into the bag 28 in a gaseous state. When the fuel composition for the rocket motor 16 is liquid hydrogen and liquid oxygen, a preferred procedure is to use the liquid hydrogen as the source of the inflation gas. The liquid hydrogen is gasified by the rocket motor in the well-known manner before introducing it into the bag 28.

In certain embodiments of the invention, such as those which rely solely on varying the thrust of the rocket motor 16 to vary the drag of the space vehicle 10, it is desirable to keep the shape of the inflatable bag 28 constant when the bag 28 is in its operational position and is reducing the velocity of the space vehicle 10. This is accomplished by maintaining a constant ratio between the internal pressure in the bag 28 and the stagnation point pressure (which is extrapolated from the external aerodynamic pressure acting on the bag 28). In theory, as adjustments are needed to keep the ratio constant, more of the inflation gas, such as hydrogen, is introduced into the bag 28 through gas inlets 41, 41' or some of the inflation gas is vented from the bag 28 by conventional means, such as bleed valves 47, 47', as necessary to maintain the constant ratio. As a practical matter, the inflation gas in the bag 28 heats up and expands during the braking operation so that there is rarely, if ever, a need to add more inflation gas after the initial inflation of the bag 28.

Figure 28:
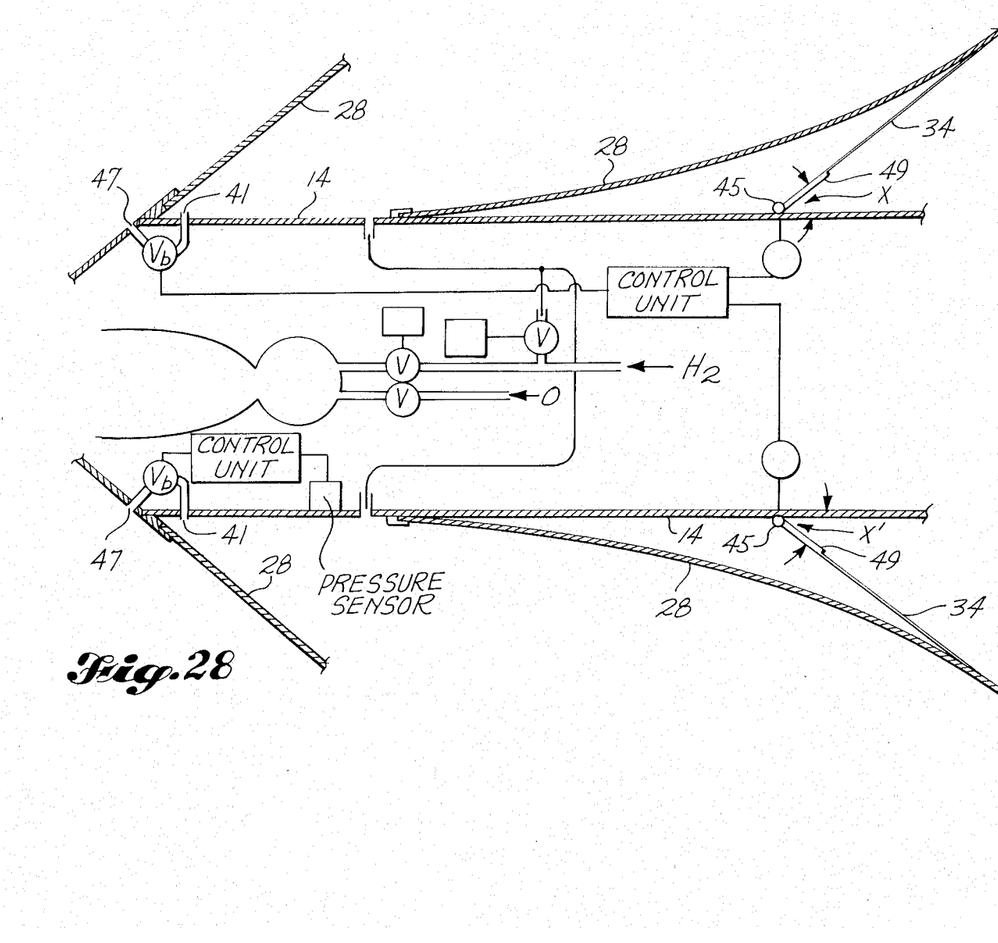
FIG. 28 is a schematic diagram of the sensors and control mechanisms used to regulate the shape of and internal pressure in the inflatable braking member in certain preferred embodiments of the present invention.

FIG. 28 is a schematic diagram of the preferred arrangement of the sensors and control mechanisms used to regulate the shape of and internal pressure in the bag 28. In this arrangement, whether adjustments are needed to keep the shape of the bag 28 constant is determined by measuring the angles x, x' between two or more of the straps 34 and the vehicle body 14. The angles x, x' are measured by sensors 49, which are similar to the arm on a potentiometer or a fuel gauge in an automobile. The signals from the sensors 49 are averaged by a control unit, and if an adjustment is necessary, valves $V_b$, which are preferably butterfly valves, are activated.

An alternative method of varying the drag of the space vehicle 10 involves keeping the thrust of the rocket motor 16 constant and, at the same time, maintaining a preprogrammed internal pressure in the inflatable bag 28. In this description, "preprogrammed internal pressure" means an internal pressure that varies according to a computer-developed schedule whose purpose is to maintain a constant bag shape over a design trajectory. Maintaining a scheduled internal pressure in the bag 28 causes it to change shape with unscheduled variations in the density of the atmosphere. The changes in the shape of the bag 28 automatically correct for the variations in density by varying the effective drag area of the bag 28 and, thus, varying the drag of the space vehicle 10. Analysis of the variation of the bag shape with changes in the ratio between the internal pressure in the bag 28 and the stagnation point pressure indicates that in general the effective drag area increases linearly with increases in such ratio. Analysis also indicates that using changes in the shape of the bag 28 to vary the drag of the space vehicle 10 can correct for density variations of up to 60%. The internal pressure in the bag 28 is maintained and controlled by means of adjustments such as those described in relation to keeping the internal pressure in a constant ratio with the stagnation point pressure. Referring to FIG. 28, the preferred procedure is to measure the internal pressure with a pressure sensor approximately every five minutes and to have a control unit compare the measured pressures with the scheduled pressures and activate valves $V_b$ to introduce inflation gas into the bag 28 or vent inflation gas from the bag 28, as necessary.

The two techniques already discussed for varying the drag of the space vehicle 10 are compatible with each other. In other words, both varying the thrust of the rocket motor 16 and maintaining a preprogrammed internal pressure in the bag 28 can be used in the same mission to accomplish the desired reduction in the velocity of the space vehicle 10. These two techniques can be employed either sequentially or concurrently. When they are used concurrently, obviously the steps of keeping the thrust of the rocket motor 16 constant and of keeping the shape of the bag 28 constant must be omitted. The combination of the two techniques expands the density correction capability of the aerodynamic braking system described herein and provides great flexibility in the carrying out of the recovery mission.

There is a further technique for varying the drag of the space vehicle 10 to insure that the velocity is reduced to the proper level. However, this technique involves exposing the space vehicle 10 and the payload to the airstream with only a limited amount of protection from overheating due to friction, which limited protection is provided by the cooling layer of gases produced by rocket motor 16. Therefore, this technique is regarded as an emergency backup procedure, for situations such as one in which the motor 16 malfunctions, and would not be used under normal operating conditions. The technique involves deflating the bag 28 after the velocity of the space vehicle 10 has been reduced to the desired level, relying on the gases produced by the motor 16 to provide a cooling layer to protect the space vehicle 10. After the bag 28 has been deflated, the space vehicle 10 is allowed to leave the sensible atmosphere and the rocket motor 16 is shut off (See FIGS. 10-17).

Even if the emergency backup procedure must be used, it is still preferable to sever the connections between the space vehicle 10 and the bag 28 to clear the directional rockets 26 and to operate the main rocket motor 16 and directional rockets 26 for placing the space vehicle 10 into a low earth orbit in the manner that is described above as the preferred procedure.

Whichever technique or techniques are used to control deceleration of the space vehicle 10, the method of this invention provides a reliable and accurate means for returning a space vehicle from a GEO to an LEO. As noted above, refurbishment is neither complicated nor expensive. Therefore, this invention has great potential for contributing to the success of the space shuttle program.

It is to be realized that the present invention may be embodied in other than the specific systems and procedures illustrated and described herein. It is intended that the specific disclosure of this document, which is of preferred embodiments and the best mode of the invention presently known to the inventor, is to be considered as illustrative and not in a limiting sense. The scope and content of the invention are to be determined by the appended claims.

I claim:

1. A method of recovering a space vehicle for reuse, comprising:
   steering such space vehicle while it is in outer space, beyond a low earth orbit, for directing the space vehicle into a return path towards the earth's atmosphere, including orienting the space vehicle so that it will enter the earth's atmosphere main rocket nozzle end first;
   extending an aerodynamic braking member that is carried by such space vehicle from a stowed position out into a large drag operational position in which it presents a large area braking surface which extends generally laterally outwardly from the space vehicle; and
   operating the main rocket motor of the space vehicle to produce gases, regulating the flow rate of such gases out through the main rocket nozzle, so that the gases will flow back and outwardly to provide a cooling layer forwardly of the braking surface but without a substantial reduction in drag, whereby the braking surface will remain effective and the braking member will reduce the velocity of the space vehicle down to a desired level.

2. A method according to claim 1, comprising using an inflatable aerodynamic braking member, and moving such member from its stowed position to its operational position by introducing an inflation gas into it, from a source stored aboard the space vehicle.

3. A method according to claim 2, comprising utilizing a fuel composition for the main rocket motor which is stored aboard the space vehicle in a liquid state for inflating said aerodynamic braking member, by introducing some of such fuel composition into the inflatable braking member in a gaseous state.

4. A method according to claim 1, comprising combining liquid oxygen and liquid hydrogen in said rocket motor, for producing a high velocity gas stream to provide thrust during periods of such rocket motor use for propelling the space vehicle, and for producing a substantially throttled stream of gases when the space vehicle is being recovered and the aerodynamic braking member is operational, for providing a layer of gases over the anterior surface of the aerodynamic braking member, to shield such braking member against destructive heating by friction during reentry of the space vehicle into the earth's atmosphere.

5. A method according to claim 1, comprising jettisoning the aerodynamic braking member from the space vehicle after it has performed its function and the space vehicle has slowed down to a desired velocity.

6. A method according to claim 5, comprising operating the main rocket motor and directional rockets aboard the space vehicle for placing the space vehicle into a low earth orbit following jettisoning of the aerodynamic braking member.

7. A method of recovering a space vehicle for reuse, comprising:
   steering such space vehicle while it is in outer space, beyond a low earth orbit, for directing the space vehicle into a return path towards the earth's atmosphere, including orienting the space vehicle so that it will enter the earth's atmosphere main rocket nozzle end first;
   extending an aerodynamic braking member that is carried by such space vehicle from a stowed position out into a large drag operational position in which it presents a large area braking surface which extends generally laterally outwardly from the space vehicle;
   operating the main rocket motor of the space vehicle to produce gases, including regulating the flow rate of such gases out through the main rocket nozzle so that the gases will flow back and outwardly to provide a cooling layer forwardly of the braking surface; and
   while so operating said rocket motor, taking steps for varying the drag of the space vehicle to correct for navigational errors and variations in the density of the atmosphere so that the braking member will reduce the velocity of the space vehicle down to a desired level.

8. A method according to claim 7, comprising using a inflatable aerodynamic braking member, and moving such member from its stowed position to its operational position by introducing an inflation gas into it, from a source stored aboard the space vehicle.

9. A method according to claim 8, wherein the steps for varying the drag of the space vehicle comprise:
keeping the thrust of the rocket motor constant; and at the same time, maintaining a preprogrammed internal pressure in the inflatable aerodynamic braking member to allow said member to change shape with variations in the density of the atmosphere and thereby automatically correct for such variations in density by varying the effective drag area of said member and, thus, varying the drag of the space vehicle.

10. A method according to claim 9, comprising:
utilizing a fuel composition for the main rocket motor which is stored aboard the space vehicle in a liquid state for inflating said aerodynamic braking member, by introducing some of such fuel composition into the inflatable braking member in a gaseous state; and
maintaining said preprogrammed internal pressure in said member by introducing more of such fuel composition into said member and venting said composition from said member, as necessary to maintain said preprogrammed internal pressure.

11. A method according to claim 8, further comprising:
shutting off said rocket motor after the velocity of the space vehicle has been reduced to said desired level;
allowing the inflatable aerodynamic braking member to gradually cool and deflate while allowing the space vehicle to leave the sensible atmosphere;
releasing connections between the space vehicle and the braking member and operating the main rocket motor, to move the braking member toward said motor and clear directional rockets aboard the space vehicle;
operating the directional rockets to orient the space vehicle for placement into a low earth orbit; and
operating the main rocket motor for propelling the space vehicle into such low earth orbit.

12. A method according to claim 11, comprising jettisoning the braking member from the space vehicle during the operation of the main rocket motor for propelling the space vehicle into such low earth orbit.

13. A method according to claim 8, comprising utilizing a fuel composition for the main rocket motor which is stored aboard the space vehicle in a liquid state for inflating said aerodynamic braking member, by introducing some of such fuel composition into the inflatable braking member in a gaseous state.

14. A method according to claim 7, wherein the steps for varying the drag of the space vehicle comprise varying the thrust of said motor while so regulating the flow rate of such gases, to vary the flow field of such gases around the braking member for varying the drag of the braking surface and thereby varying the drag of the space vehicle, so that the velocity of the space vehicle will be reduced to the desired level and, at the same time, such gases will provide a cooling layer forwardly of the braking surface.

15. A method according to claim 14, comprising:
using an inflatable aerodynamic braking member, and moving such member from its stowed position to its operational position by introducing an inflation gas into it from a source stored aboard the space vehicle; and
keeping the shape of said braking member constant, when said member is in its operational position and is reducing the velocity of the space vehicle, by maintaining a constant ratio between the internal pressure in said member and the external stagnation point pressure.

16. A method according to claim 5, comprising:
utilizing a fuel composition for the main rocket motor which is stored aboard the space vehicle in a liquid state for inflating said aerodynamic braking member, by introducing some of such fuel composition into the inflatable braking member in a gaseous state; and
adjusting the internal pressure in said member by introducing more of such fuel composition into said member and venting said composition from said member, as necessary to maintain said constant ratio.

17. A method according to claim 14:
comprising using an inflatable aerodynamic braking member, and moving such member from its stowed position to its operational position by introducing an inflation gas into it, from a source stored aboard the space vehicle; and
wherein the steps for varying the drag of the space vehicle further comprise maintaining a preprogrammed internal pressure in said braking member to allow said member to change shape with variations in the density of the atmosphere and thereby automatically correct for such variations in density by varying the effective drag area of said member and, thus, varying the drag of the space vehicle.

18. A method according to claim 14, comprising combining liquid oxygen and liquid hydrogen in said rocket motor, for producing a high velocity gas stream to provide thrust during periods of such rocket motor use for propelling the space vehicle, and for producing a substantially throttled stream of gases when the space vehicle is being recovered and the aerodynamic braking member is operational, for providing a layer of gases over the anterior surface of the aerodynamic braking member to shield such braking member against destructive heating by friction with the earth's atmosphere and to vary to drag of the space vehicle so that the braking member will reduce the velocity of the space vehicle to the desired level.

19. A method according to claim 15, claim 9, or claim 17:
wherein the steps for varying the drag of the space vehicle further comprise deflating the aerodynamic braking member after the velocity of the space vehicle has been reduced to said desired level, relying on the gases produced by the main rocket motor to provide a cooling layer to protect the space vehicle; and
further comprising allowing the space vehicle to leave the sensible atmosphere after deflating said braking member; and shutting off said rocket motor.

* * * * *

UNITED STATES PATENT AND TRADEMARK OFFICE
CERTIFICATE OF CORRECTION

PATENT NO. : 4,504,031
DATED : March 12, 1985
INVENTOR(S) : Dana G. Andrews

It is certified that error appears in the above-identified patent and that said Letters Patent are hereby corrected as shown below:

Column 2, line 34, "descent" should be --descend--.

Column 8, line 41, ";" should be --,--.

Column 16, line 49, "to", second occurrence, should be --the--.

Signed and Sealed this

Seventeenth Day of September 1985

[SEAL]

Attest:

Attesting Officer

DONALD J. QUIGG

Commissioner of Patents and Trademarks—Designate